(12) United States Patent
Mikawa

(10) Patent No.: US 8,897,615 B2
(45) Date of Patent: Nov. 25, 2014

(54) MOVING IMAGE REPRODUCTION APPARATUS AND METHOD

(75) Inventor: Chiaki Mikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/289,420

(22) Filed: Nov. 4, 2011

(65) Prior Publication Data

US 2012/0114304 A1 May 10, 2012

(30) Foreign Application Priority Data

Nov. 9, 2010 (JP) .................................. 2010-251155

(51) Int. Cl.
*H04N 5/932* (2006.01)
*H04N 9/82* (2006.01)
*H04N 5/783* (2006.01)
*H04N 5/85* (2006.01)
*G11B 27/00* (2006.01)
*G11B 20/10* (2006.01)

(52) U.S. Cl.
CPC ............ *G11B 27/005* (2013.01); *H04N 9/8205* (2013.01); *H04N 5/783* (2013.01); *H04N 9/8233* (2013.01); *G11B 2020/10537* (2013.01); *H04N 5/85* (2013.01)
USPC .......................................... 386/206; 386/200

(58) Field of Classification Search
None
See application file for complete search history.

(56) References Cited

U.S. PATENT DOCUMENTS

| | | | |
|---|---|---|---|
| 2008/0022350 A1* | 1/2008 | Hostyn et al. | 725/139 |
| 2010/0011402 A1* | 1/2010 | Oshima | 725/118 |
| 2010/0172633 A1* | 7/2010 | Ohbitsu | 386/96 |
| 2011/0158613 A1* | 6/2011 | Yamanashi | 386/343 |

FOREIGN PATENT DOCUMENTS

| | | |
|---|---|---|
| JP | 2004-221999 A | 8/2004 |
| JP | 2007-166501 A | 6/2007 |
| JP | 2009-164969 A | 7/2009 |

* cited by examiner

*Primary Examiner* — William Vaughn
*Assistant Examiner* — Eileen Adams
(74) *Attorney, Agent, or Firm* — Canon USA, Inc. IP Division

(57) ABSTRACT

A moving image reproduction apparatus includes an instruction unit, an acquisition unit, a playback speed determination unit, and a moving image reproduction unit. The instruction unit is configured to issue a change instruction for changing a playback target to another moving image while a selected moving image is being played back. The acquisition unit is configured to, if the change instruction has been issued by the instruction unit, acquire a playback time of the moving image which has been played back until the change instruction. The playback speed determination unit is configured to determine a playback speed of the moving image to be played back after the change instruction, according to the playback time. The moving image reproduction unit is configured to play back the moving image instructed for reproduction by the change instruction at the playback speed.

15 Claims, 12 Drawing Sheets

FIG.8

| FILE NAME | FILE TYPE | FILE KIND | PLAYBACK TIME (IN SEC) |
|---|---|---|---|
| IMG_001.MOV | MOVING IMAGE | HIGH-SPEED MOVING IMAGE | 7.2 |
| IMG_002.JPG | STILL IMAGE | STILL IMAGE | 1.0 |
| IMG_003.MOV | MOVING IMAGE | HIGH-SPEED MOVING IMAGE | 4.8 |
| IMG_004.MOV | MOVING IMAGE | NORMAL MOVING IMAGE | 5.4 |
| IMG_005.MOV | MOVING IMAGE | NORMAL MOVING IMAGE | 8.0 |
| IMG_006.JPG | STILL IMAGE | STILL IMAGE | 0.8 |
| IMG_007.MOV | MOVING IMAGE | NORMAL MOVING IMAGE | 6.6 |
| IMG_008.MOV | MOVING IMAGE | INTERVAL MOVING IMAGE | 3.0 |
| IMG_009.MOV | MOVING IMAGE | INTERVAL MOVING IMAGE | 5.7 |
| IMG_010.MOV | MOVING IMAGE | HIGH-SPEED MOVING IMAGE | 7.3 |

FIG.11

| FILE NAME 1101 | FILE TYPE 1102 | PLAYBACK TIME FROM BEGINNING TO END IN PLAYBACK FR 1103 | PLAYBACK TIME (IN SEC) 1104 | PERCENTAGE OF PLAYBACK TIME (%) 1105 |
|---|---|---|---|---|
| IMG_001.MOV | MOVING IMAGE | 20 | 6.2 | 31 |
| IMG_002.JPG | STILL IMAGE | -1 | 1.0 | -1 |
| IMG_003.MOV | MOVING IMAGE | 40 | 3.8 | 9.5 |
| IMG_004.MOV | MOVING IMAGE | 120 | 4.8 | 4 |
| IMG_005.MOV | MOVING IMAGE | 7 | 7.0 | 100 |
| IMG_006.JPG | STILL IMAGE | -1 | 0.8 | -1 |
| IMG_007.MOV | MOVING IMAGE | 200 | 5.6 | 2.8 |
| IMG_008.MOV | MOVING IMAGE | 80 | 2.0 | 2.5 |
| IMG_009.MOV | MOVING IMAGE | 10 | 4.7 | 47 |
| IMG_010.MOV | MOVING IMAGE | 60 | 6.3 | 10.5 |

MOVING IMAGE REPRODUCTION APPARATUS AND METHOD

BACKGROUND OF THE INVENTION

1. Field of the Invention

Embodiments of the present invention relate to a moving image reproduction apparatus and a moving image reproduction method that reproduces a moving image.

2. Description of the Related Art

For example, in Japanese Patent Application Laid-Open No. 2004-221999, there is discussed a technique for shooting, at a high frame rate, a momentary image that is impossible to perceive with human eyes, and recording it as a moving image. Hereinafter, the moving image acquired at the high frame rate is referred to as a high-speed moving image. There is available an apparatus that reproduces the high-speed moving image at a slow speed so that a momentary motion may be perceived, when the high-speed moving image is reproduced.

However, in Japanese Patent Application Laid-Open No. 2004-221999, even when a desired moving image is searched for in a hurry from among a plurality of still images and moving images, the high-speed moving image would be reproduced slowly. Thus, there is a problem that an outline of the moving image may not be efficiently grasped.

SUMMARY OF THE INVENTION

One disclosed aspect of an embodiment of the present invention is directed to enabling, when a desired moving image is searched for from among a plurality of still images or moving images, an outline of the desired moving image to be efficiently grasped, even if it is a high-speed moving image.

According to an aspect of one embodiment, a moving image reproduction apparatus includes an instruction unit configured to issue a change instruction for changing a playback target to another moving image while a selected moving image is being played back, an acquisition unit configured to, if the change instruction has been issued by the instruction unit, acquire a playback time of the moving image which has been played back until the change instruction, a playback speed determination unit configured to determine a playback speed of the moving image to be played back after the change instruction, according to the playback time acquired by the acquisition unit, and a moving image reproduction unit configured to play back the moving image instructed for reproduction by the change instruction at the playback speed determined by the playback speed determination unit.

Further features and aspects of embodiments of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of embodiments of the invention and, together with the description, serve to explain the principles of the invention.

FIG. 8 illustrates an example of data of a playback time list in the moving image reproduction apparatus according to the second exemplary embodiment.

FIG. 11 illustrates an example of data of a playback time list in the moving image reproduction apparatus according to the third exemplary embodiment.

DESCRIPTION OF THE EMBODIMENTS

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

A moving image reproduction apparatus according to an exemplary embodiment of the present invention reproduces image data and moving image data obtained by an electronic camera such as a digital still camera or a digital video camera, which captures an image by converting an optical image into an electrical image data using a solid-state image sensor. In the present exemplary embodiment, descriptions will be given of the moving image reproduction apparatus according to the present exemplary embodiment, which may change a playback speed of a high-speed moving image according to a playback time of a moving image most recently selected.

As an example of an information processing apparatus that operates as the moving image reproduction apparatus according to the present exemplary embodiment, a configuration of a personal computer will be described.

Figure 1:
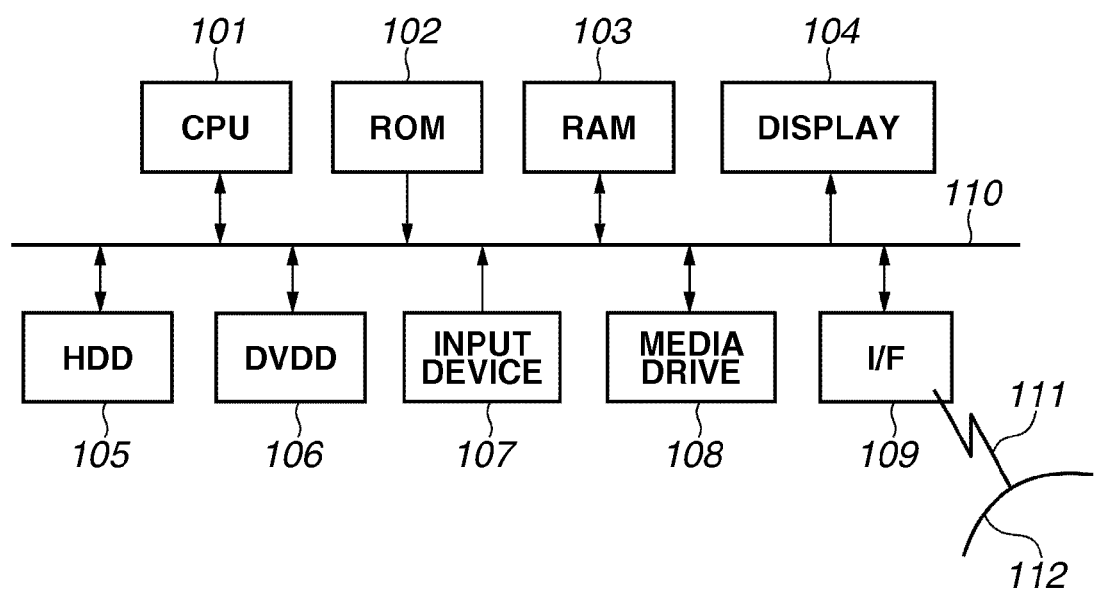
FIG. 1 is a block diagram illustrating a configuration of an information processing apparatus according to a first exemplary embodiment of the present invention.

FIG. 1 is a block diagram illustrating a configuration of a personal computer according to a first exemplary embodiment of the present invention. By reading out a predetermined control program from a storage medium, and executing it under control of a central processing unit (CPU), the personal computer implements moving image reproduction processing as will be described below, and works as the moving image reproduction apparatus.

In FIG. 1, a CPU 101 performs control of the entire apparatus. A read-only memory (ROM) 102 stores an operation processing procedure (e.g., a program for start-up processing of a computer or basic input and output processing) of the CPU 101. A random-access memory (RAM) 103 works as a main memory for the CPU 101. Various types of programs including a control program for realizing processing described below are loaded into the RAM 103 from a hard disk drive 105 or the like, and executed by the CPU 101. Further, the RAM 103 provides a work area when the CPU 101 executes various types of processing.

Each disk of a hard disk drive 105 (hereinafter, HDD) and a digital versatile disc drive (hereinafter, DVDD) 106 is used for storage and readout of application programs, data, library, and the like. Further, in place of the DVDD, or in addition thereto, an optical (magnetic) disk drive such as a compact disc read-only memory (CD-ROM), a magneto-optical disk (MO), a magnetic tape drive such as a tape streamer, or a digital data storage (DDS) may be provided.

An input device 107 is a keyboard or a pointing device or the like. A display 104 performs various types of displays under control of the CPU 101.

A storage medium attachment unit (media drive) 108 may receive a detachably attachable storage medium to enable readout of data captured and stored by a still digital camera. A network interface 109 is connected to a computer network 112 via a communication line 111. Data is transmitted to and received from devices which may communicate via the network interface 109. A system bus (composed of an address bus, a data bus, and a control bus) 110 establishes connection among respective units described above.

Figure 2:
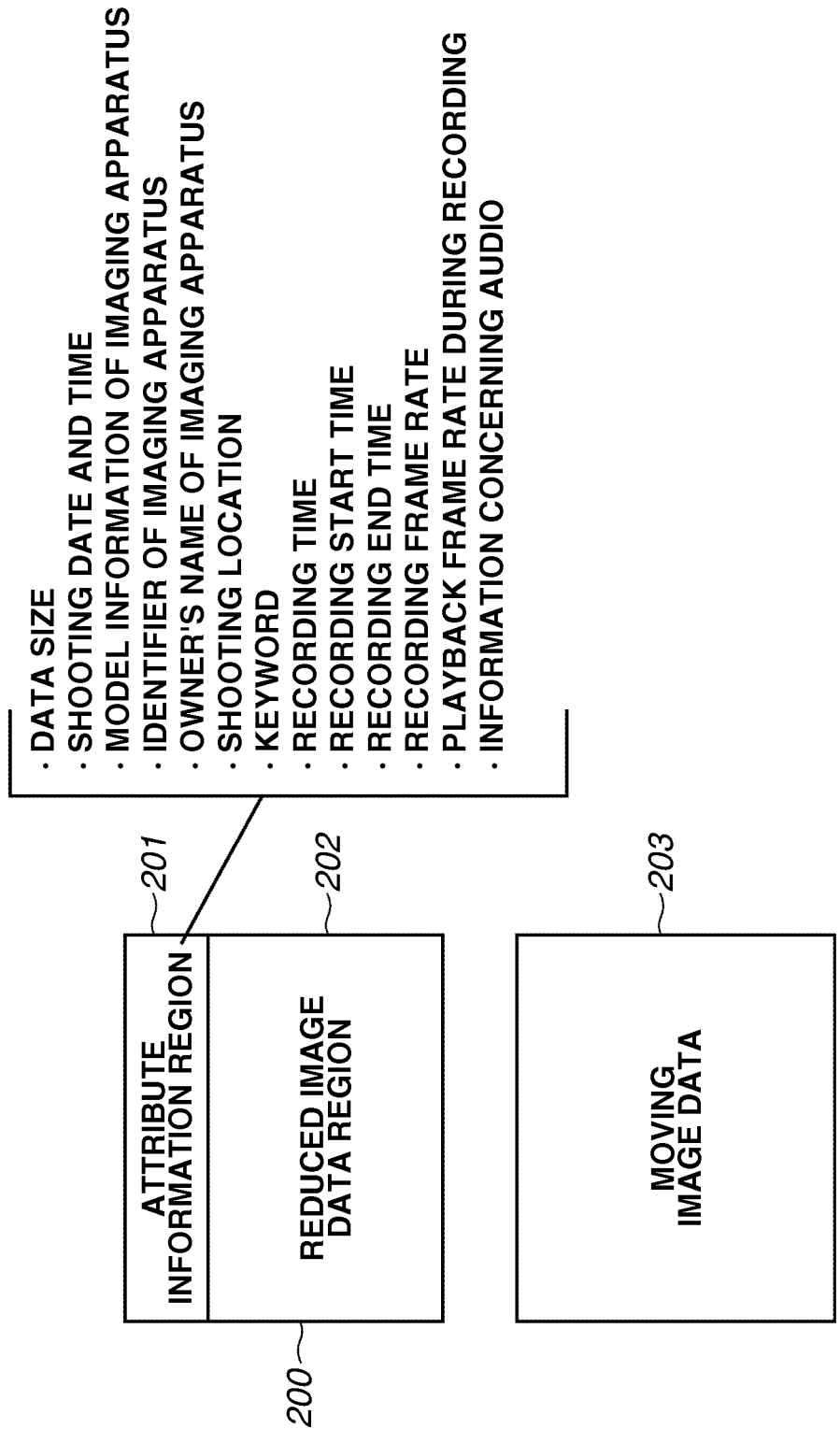
FIG. 2 is a schematic configuration diagram of a moving image file which becomes a processing target of a moving image reproduction apparatus according to the first exemplary embodiment.

FIG. 2 is a schematic configuration diagram of a moving image file, which becomes a processing target of the moving image reproduction apparatus according to the first exemplary embodiment.

In FIG. 2, a moving image information file 200 is stored and recorded in association with moving image data 203 described below, and is composed of an attribute information region 201 and a reduced image data region 202, which is used for a list display.

The attribute information region 201 is a region for storing shooting date and time, identifier of imaging apparatus, model information of imaging apparatus, owner's name of imaging apparatus, recording time, recording start time, recording end time, number of frames recorded per second, number of frames played back per second, information concerning audio, and so forth. By the attribute information, the information processing apparatus may know information during shooting and information necessary for readout and playback of images.

The reduced image data region 202 is a region for storing reduced image data to be displayed at the time of a list display. In the present exemplary embodiment, the reduced image data region 202 stores a reduced image generated from image data of a head frame of the moving image.

The moving image data file 203 stores all pieces of moving image data which should be stored as the moving image files.

The moving image data file 203 is associated with the moving image information file 200, and information of the moving image information file 200 is utilized when the moving image data within the moving image data file 203 is played back.

In the present exemplary embodiment, a storage method for information of the attribute information region 201 and the reduced image data region 202 will be described below assuming that it is compliant with the Design rule for Camera File (DCF) System. With regard to information with a determined tag, which is recorded in advance according to the DCF system, the imaging apparatus records the information in conformity with the system, and uses a region for manufacturer note, if there is no appropriate tag for recording.

Hereinafter, the number of frames recorded per second is referred to as a recording frame rate. The number of frames to be played back per second, which a manufacturer of an electronic camera recommends, is referred to as a playback frame rate during recording. Further, frame/sec is referred to as fps.

A frame rate at the time of playback in the moving image reproduction apparatus is usually 29.97 fps for National Television System Committee (NTSC) video, 25 fps for phase alteration by line (PAL) video, and 24 fps for motion picture. When a user manipulates an electronic camera to record a moving image, the user often uses a frame rate matching a frame rate to be played back. In contrast, in a high-speed moving image which intends to capture a momentary image that is impossible to perceive with human eyes, the moving image is recorded at a frame rate higher than the playback frame rate. For example, the recording frame rate is set to 240 fps and the playback frame rate during recording is set to 30 fps. In this example, in the moving image reproduction apparatus, during playback at the playback frame rate during recording, an event which occurred in one second will be played back in eight seconds. In short, at a speed of one-eighth of an actual speed of an event, the event will be played back. Hence, in the high-speed moving image, the event may be played back at a slow speed enough to enable a person to perceive a momentary motion. Hereinafter, the actual speed of an event is referred to as an actual time speed. If the recording frame rate is 30 fps, the actual time speed is attained when the event is played back at 30 fps. Further, if the recording frame rate is 240 fps, the actual time speed is attained when the event is played back at 240 fps.

Figure 3:
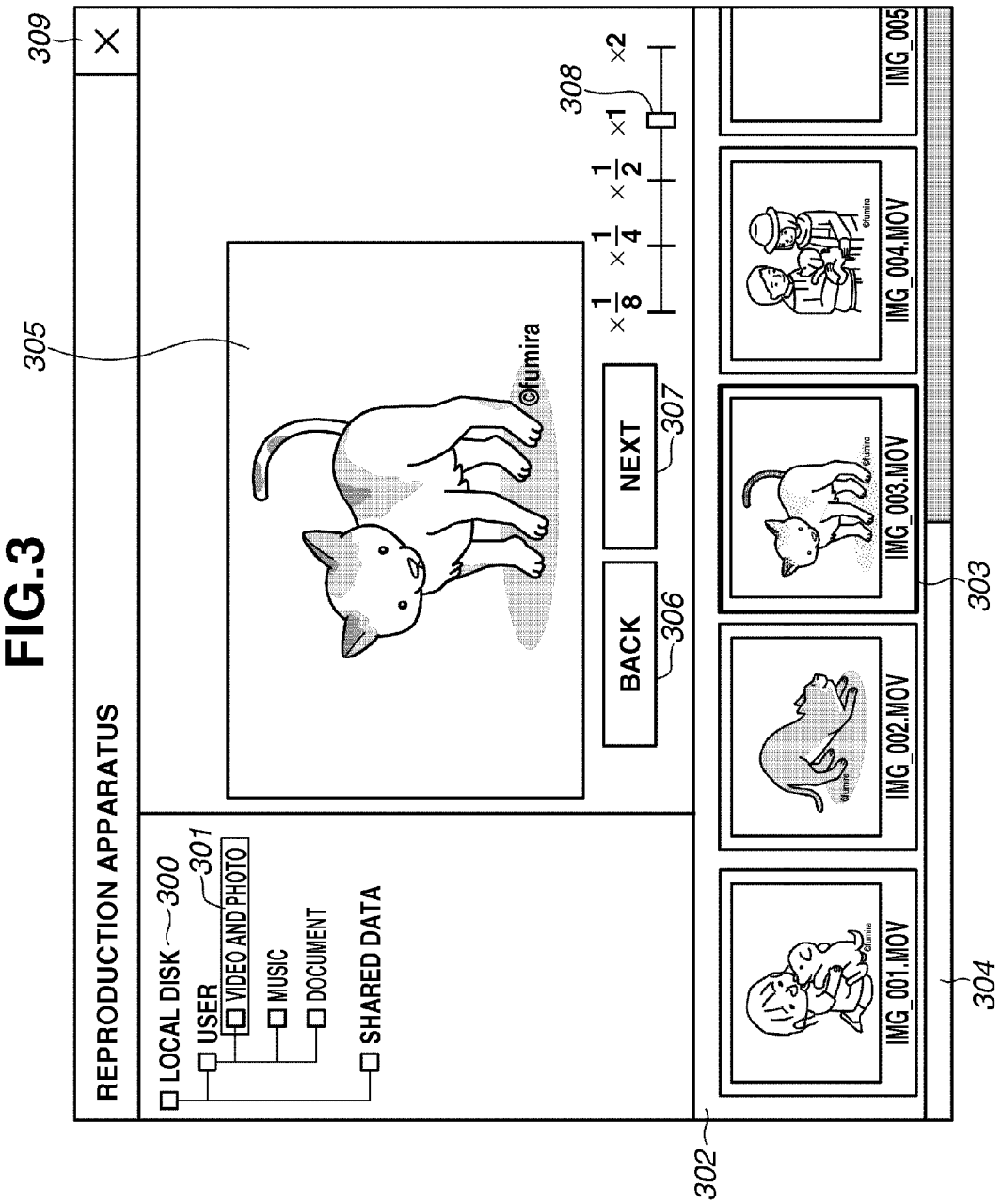
FIG. 3 illustrates a playback screen to be displayed on a display device of the moving image reproduction apparatus according to the first exemplary embodiment.

FIG. 3 illustrates a playback screen which the moving image reproduction apparatus according to the first exemplary embodiment displays on the display device. Roughly, the screen is composed of an area 300 for displaying a folder tree, an area 302 for display of a list of images, and an area 305 for enlarged display. Hereinafter, they are referred to as a tree view area 300, a thumbnail area 302, and a preview area 305, respectively.

The details of a user interface of the moving image reproduction apparatus will be described below. The area 300 displays, in the form of the folder tree, data classified by folder and stored within the HDD 105. When the user moves a pointing device and clicks on a folder name, the CPU 101 determines that the clicked folder has been selected and puts the folder into a selected state. If the user clicks on a folder that contains plural underlying folders using the pointing device, the CPU 101 puts the folder into a selected state, and lists folders at one lower hierarchical level on the right-hand side of the selected folder.

A folder selection frame 301 indicates the selected state of a folder. The area 302 displays reduced images for tabulation of still image and moving image files to be stored immediately beneath the folder selected by the folder tree area 300. When the user clicks on any one of the plural reduced images displayed on the thumbnail area 302 by using the pointing device, the CPU 101 determines that a file corresponding to the reduced image has been selected and puts the file into a selected state. In the present exemplary embodiment, the files to be displayed in the thumbnail area 302 are supposed to be lined in the order of file names. If a thumbnail of another moving image is selected by manipulating the pointing device while the moving image is being played back, this means that an instruction for change of the moving image of the playback target has been issued.

A file selection frame 303 indicates the selected state of a file. A horizontal scroll bar 304 is an operation member for moving display regions in a horizontal direction. If there are more reduced images within the folder of the selection target, so much that the thumbnail area 302 may not display, a percentage of reduced images being displayed is indicated by a knob. When the user drags and moves the knob by using the pointing device or the like, the CPU 101 determines that a movement operation of the display regions within the thumbnail area 302 has occurred, and moves them in the horizontal direction.

The preview area 305 is an area where to play back data of a still image or a moving image of a file which is in the selected state. The instruction for changing a file displayed in the preview area 305 is issued by pressing a button, for example, a back button 306 or a next button 307. Alternatively, the instruction may be issued by moving the pointing device to and clicking on a reduced image for list within the thumbnail area 302. In the moving image reproduction apparatus according to the present exemplary embodiment, if the file switched by operation for changing a playback target is a moving image file, it is supposed to start change of the playback target and playback of the moving image. A determination method of a playback speed of the moving image will be described below.

The back button 306 or the next button 307 is used to issue an instruction for changing the playback target. When the user presses the back ton 306 by operation of the pointing device, the CPU 101 determines that an instruction for changing the playback target to one previous file has been issued, and switches between selections to a file which falls under the one previous in the order of file names. If the back button 306 selects a head image in the thumbnail area, the CPU 101 disables switching between selections since any further than the previous image may not be selected. Alternatively, even when the back button 306 is pressed, the CPU 101 avoids switching between selections as an invalid command.

If the user presses the next button 307 by operation of the pointing device, the CPU 101 determines that an instruction for changing the playback target to one next file has been issued, and switches between selections to a file which falls under the one next in the order of file names. If the next button 307 selects the last image in the thumbnail area 302, the CPU 101 disables switching between selections since any further than the next image may not be selected. Alternatively, even when the next button 307 is pressed, the CPU 101 avoids switching between selections as an invalid command.

A playback speed slider 308 performs display and change of playback speeds. If a moving image is played back in the preview area 305, the knob is displayed at a position corresponding to the playback speed of the moving image. If a still image is in the selected state, the playback speed slider 308 is disabled since the playback speed may not be displayed or changed. If the user has changed a position of the knob by operation of the pointing device, the CPU 101 determines that the user has issued a playback speed change instruction, and changes the playback speed to a speed corresponding to the position of the knob to play back the moving image. The mark ×1 in the playback speed slider 308 indicates the actual time speed. If the recording frame rate of the selected moving image file is 30 fps, when the knob of the playback speed slider 308 is changed to a position ×½, and the moving image is played back at 15 fps. Since the actual time speed is 30 fps, the moving image, when played back at 15 fps, will be played back at a speed as slow as one half of the actual time speed. In the moving image file, when the knob in the playback speed slider 308 is changed to a position ×2, the moving image is played back at 60 fps. Since the actual time speed is 30 fps, the moving image, when played back at 60 fps, will be played back at a speed twice faster than the actual time speed.

Assuming that variables retain the following values, a frame rate during playback according to a playback speed is given in Equation (1).
recodeFps: recording frame rate (fps)
playFps: frame rate during playback (fps)
playSpeed: playback speed if actual time speed is 1

$$playFps=playSpeed \times recodeFps \quad (1)$$

If the CPU 101 determines a playback speed at the time of changing the playback target, and plays back at 60 fps a moving image file with a recording frame rate of 240 fps, the CPU 101 displays a position of the knob indicating the playback speed at ×¼. A playback speed according to the frame rate is given in Equation (2).

$$playSpeed=playFps \div recodeFps \quad (2)$$

An end button 309 is used to end the moving image reproduction apparatus in the present exemplary embodiment.

Figure 4:
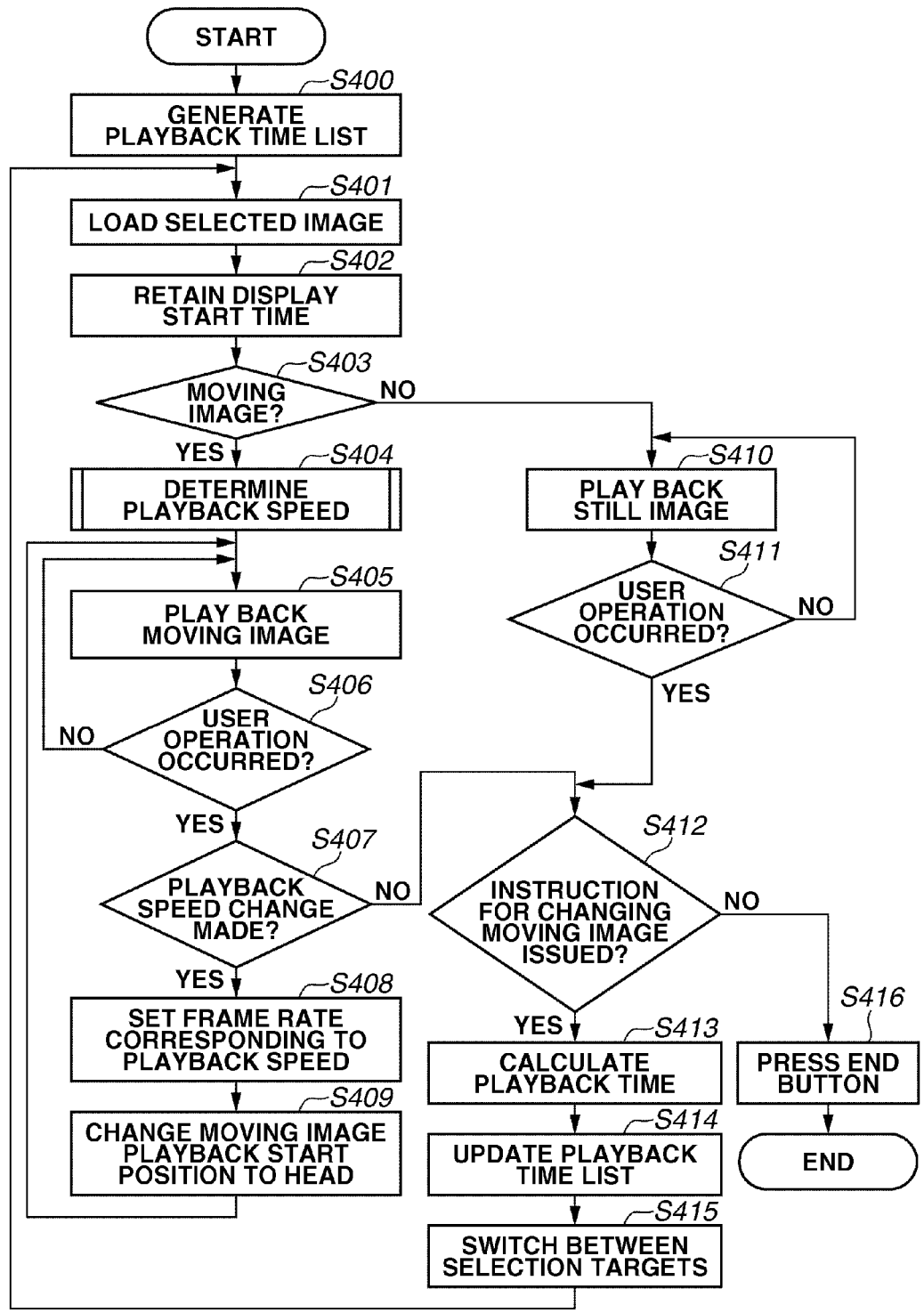
FIG. 4 is a flowchart illustrating operations of reproduction processing by the moving image reproduction apparatus according to the first exemplary embodiment

FIG. 4 is a flowchart illustrating operations of reproduction processing by the moving image reproduction apparatus according to the first exemplary embodiment. The present processing is executed by the CPU 101 executing a control program stored in the RAM 103.

Figure 5:
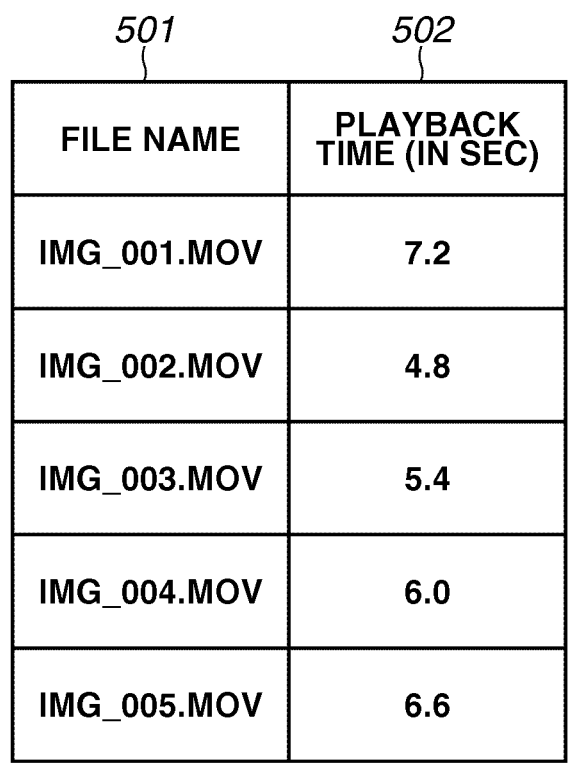
FIG. 5 illustrates an example of data of a playback time list in the moving image reproduction apparatus according to the first exemplary embodiment.

FIG. 5 illustrates an example of data of a playback time list in the moving image reproduction apparatus according to the first exemplary embodiment. The CPU 101 generates and stores the data in the RAM 103. A column 501 stores file names of selection targets. A column 502 stores times taken to play back the files in the column 501. Image reproduction processing of moving image and still image will be described below with reference to FIG. 4 and FIG. 5.

In operation S400, the CPU 101 generates a list of playback times. The list is used to record and manage playback times of the moving images which have been played back. In the present exemplary embodiment, the CPU 101 manages the playback times of plural moving images which have been most recently played back. Thereby, if instructions for changing the moving images of the playback targets have been issued plural times, the CPU 101 may know the playback times of the respective moving images involved in the plural times of changes. Thereby, for example, an average time of the playback times of the respective moving images may be calculated.

The list of the playback times in the moving image reproduction apparatus according to the present exemplary embodiment is supposed to store information concerning five files. Thereby, the CPU 101 manages five moving images at maximum which have been recently played back. As a matter of course, it is not limited to five, but the CPU 101 may adopt another number. Immediately after the files are generated, the CPU 101 records NULL in respective file names, and 0 in the playback times.

In operation S401, the CPU 101 loads into the RAM 103 images selected by the user from the HDD 105 or the media drive 108. For example, the user selects a folder by the tree view area 300. Then, the CPU 101 performs list display of still images and moving images stored immediately beneath the selected folder in the thumbnail area 302. If the user is not performing a selection operation of a file, a head file is assumed to be in the selected state. Further, if the user, after activating the moving image reproduction apparatus in the present exemplary embodiment, has not performed a folder selection operation, one of existing folders is assumed to be in the selected state.

In operation S402, the CPU 101 stores a time in the RAM 103, as a time when playback of the selected file was started. In operation S403, the CPU 101 determines whether the selected file is a moving image file. If it is determined that the selected file is a moving image file (YES in operation S403), the processing proceeds to operation S404. If it is determined that the selected file is not a moving image file (NO in operation S403), the processing proceeds to operation S410. In operation S404, the CPU 101 determines a playback speed of the moving image, and stores it in the RAM 103 as a frame rate for playback. Playback speed determination processing of a moving image will be described below with reference to FIG. 4.

In operation S405, the CPU 101 plays back moving image data, at the frame rate for playback stored in the RAM 103, in the preview area 305. The CPU 101 displays the knob of the playback speed slider 308 at a position of the playback speed corresponding to the frame rate for playback, during moving image playback. A playback speed corresponding to the frame rate is as given in Equation (2).

In operation S406, the CPU 101 determines whether an operation from the user has occurred. If it is determined that an operation from the user has occurred (YES in operation S406), the processing proceeds to operation S407. If it is determined that an operation from user has not occurred (NO in operation S406), the processing returns to operation S405. Subsequently the CPU 101 plays back the moving image.

In operation S407, the CPU 101 determines whether the user has made a playback speed change. If it is determined that the user has changed the playback speed (YES in operation S407), the processing proceeds to operation S408. If it is determined that the user has not changed the playback speed (NO in operation S407), the processing proceeds to operation S412. In the moving image reproduction apparatus according to the present exemplary embodiment, an operation for the user to change the playback speed is an operation to move the knob of the playback speed slider 308.

In operation S408, the CPU 101 calculates a frame rate corresponding to the playback speed which the user has designated, and stores it in the RAM 103 as a frame rate for playback. A frame rate corresponding to a playback speed is as given in Equation (1).

In operation S409, the CPU 101 changes a start position of the moving image playback to a position of a head frame of the moving image data. Then, the processing returns to operation S405. In operation S405, the CPU 101 plays back the moving image from the head thereof at a speed which the user has designated.

In operation S410, the CPU 101 plays back the still image data in the preview area 305.

In operation S411, the CPU 101 determines whether an operation from the user has occurred. If it is determined that an operation from the user has occurred (YES in operation S411), the processing proceeds to operation S412. If it is determined that an operation from the user has not occurred (NO in operation S411), the processing returns to operation S410, where subsequently the CPU 101 plays back the still image.

In operation S412, the CPU 101 determines whether an instruction for changing the moving image of the playback target has been issued by the user. The instruction for changing the moving image refers to, for example, an operation of clicking on the back button 306 or the next button 307 with the pointing device. If it is determined that the instruction for changing the moving image has been issued (YES in operation S412), the processing proceeds to operation S413. If it is determined that the instruction for changing the moving image of the playback target has not been issued (NO in operation S412), the processing proceeds to operation S416.

In operation S413, the CPU 101 stores in the RAM 103 a time when playback of the file loaded in operation S401 has ended. Then, the CPU 101 calculates and acquires a playback time based on a difference from the start time stored in operation S402. The CPU 101, after acquisition of the playback time is completed, discards the start time and the end time from the RAM 103.

In operation S414, the CPU 101 updates the playback time list illustrated in FIG. 5. A file name of the selected file loaded in operation S401 is stored in the column 501, and a playback time of the file is stored in the column 502 of the playback time list. If there is NULL in the column 501 of file name in the playback time list, the file name and the playback time are stored in a row where contains the top NULL. If file names are stored instead of NULL in all five data in the playback time list, the file name and the playback time are stored in an empty row at the end by deleting the top row, and moving upward the second and beyond rows one row by one row. Through the processing, the playback times relating to most recent five files or less are stored as a list.

In operation S415, the CPU 101 switches between files of the playback targets in accordance with the instruction for changing the moving image of the playback target. In operation S416, the CPU 101, assuming that the end button has been pressed, performs a series of end processing to end the moving image reproduction apparatus, such as closing a file being opened for data loading, and discarding information stored in the RAM 103.

Figure 6:
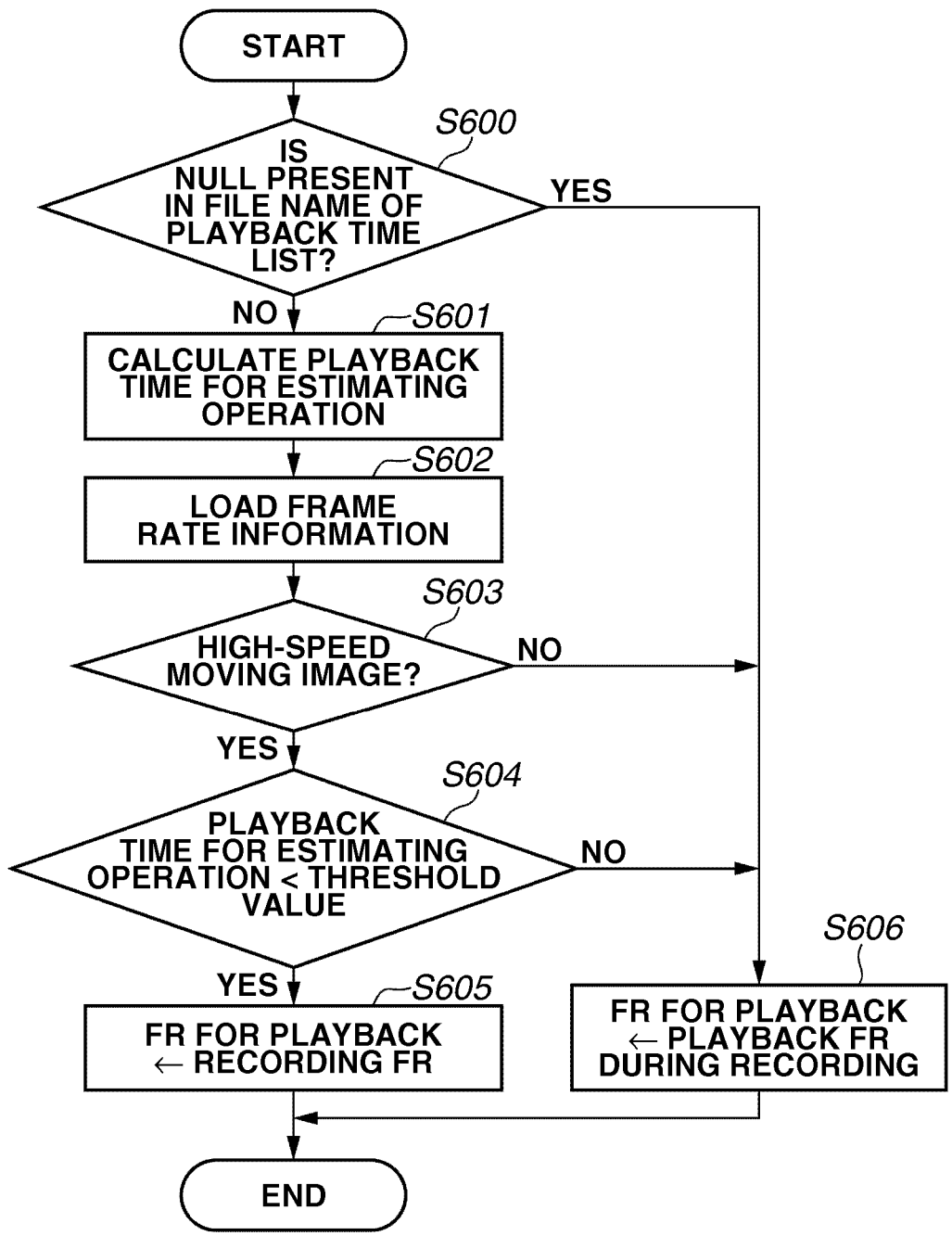
FIG. 6 is a flowchart illustrating operations of moving image playback speed determination processing by the moving image reproduction apparatus according to the first exemplary embodiment.

FIG. 6 is a flowchart illustrating the operations of moving image playback speed determination processing by the moving image reproduction apparatus according to the first exemplary embodiment. The present processing is executed by executing a control program stored in the RAM 103 by the CPU 101. The moving image playback speed determination processing falls under the processing in operation S404 in FIG. 4. The details of the processing will be described below with reference to FIG. 6.

In operation S600, the CPU 101 determines whether NULL is present in the file name in the playback time list stored in the RAM 103. If it is determined that NULL is present (YES in operation S600), it is determined that necessary information for estimating an operation is not complete, and the processing proceeds to operation S606. If it is determined that NULL is not present (NO in operation S600), it is determined that there is necessary information for estimating an operation, and the processing proceeds to operation S601.

In operation S601, the CPU 101 calculates a playback time for estimating the user's operation. The user's operation refers to an operation of searching for a desired moving image from among a plurality of moving images and still images, or an operation of carefully viewing contents of respective files. An average of the playback times of five files most recently selected, stored in the playback time list illustrated in FIG. 5, is taken as the playback time for estimating operation. In the case of the playback times illustrated in FIG. 5, the playback time for estimating operation becomes 6 seconds.

In operation S602, the CPU 101 loads information of the recording frame rate and the playback frame rate during recording into the RAM 103, from the attribute information region 201 of the moving image information file 200 associated with the moving image data file 203 which is the selection target.

In operation S603, the CPU 101 determines whether the moving image is a high-speed moving image. If the recording frame rate is greater than the playback frame rate during recording, it is determined as the high-speed moving image. If the recording frame rate is equal to less than the playback frame rate during recording, it is determined that the moving image is not a high-speed moving image. If it is determined that the moving image is a high-speed moving image (YES in operation S603), the processing proceeds to operation S604. If it is determined that the moving image is not a high-speed moving image (NO in operation S603), the processing proceeds to operation S606.

In operation S604, the CPU 101 compares the playback time for estimating operation calculated in operation S601 with a threshold value, to determine whether the playback time for estimating operation is smaller than the threshold value. In the moving image reproduction apparatus according to the present exemplary embodiment, the threshold value is 30 seconds. If the playback time for estimating operation is smaller than the threshold value, it is estimated that the user is searching for a desired moving image, while changing in a short time moving images for playback. If the playback time for estimating operation is equal to or greater than the threshold value (NO in operation S604), it is estimated that the user is carefully viewing the contents of the respective files. If it is determined that the playback time for estimating operation is smaller than the threshold value (YES in operation S604), the processing proceeds to operation S605. If it is determined that the playback time for estimating operation is equal to or greater than the threshold value (NO in operation S604), the processing proceeds to operation S606.

In operation S605, the CPU 101 stores the recording frame rate in the RAM 103 as the frame rate for playback. By taking the recording frame rate as the frame rate for playback, playback will be performed at the actual time speed. In the present exemplary embodiment, there has been described the moving images obtained by playing back more slowly than the actual time, images obtained by high-speed shooting. For this reason, an example for playback at the actual time in operation S605 has been given, but it is not limited to this. In such a case where images are switched in a short time, it is only necessary to play back the images at a higher speed than a normal speed when the moving image is played back, and how high speed relative the normal playback speed may be changed as appropriate. For example, it is acceptable to set multi-stage playback speed according to a length of the average playback time. Further, for example, it is acceptable to make the playback speed even faster on inversely proportional basis, as the average playback time becomes shorter.

Further, a method for calculating a playback time for estimating operation is also not limited to the above-described exemplary embodiment. Instead, as long as a method estimates an operation of continuously switching between images by the user, the method may be changed as appropriate.

In operation S606, the CPU 101 stores the playback frame rate during recording in the RAM 103 as the frame rate for playback.

In the present exemplary embodiment, the playback times of the five files most recently selected are stored in the playback time list, but it is not limited to five. For example, playback times of ten files may be stored. If there are many files, there is a possibility that determination may be performed with a good accuracy.

In the present exemplary embodiment, a description has been given of a method for changing a playback speed of the high-speed moving image, when it has been estimated that the user is searching for a desired moving image. At this time, audio of the moving image may be prevented from being played back. When the user is searching in a hurry for the desired moving image, audio flow may be annoying sometimes. In such a case, the moving image reproduction apparatus performs control to prevent playback of audio from being performed, so that the user becomes easily able to concentrate on grasping the outline of the moving images. Further, audio is played back during the playback speed of actual time, but in the case of other speeds, it is also useful to prevent audio from being played back. This is because, although the playback speed of the actual time makes hearing of audio easier, a speed faster or slower than the actual time makes hearing of audio difficult, which is likely to become a hindrance to the grasp of the outline of the moving images, on the other hand. For this reason, such switching control is also useful.

In the present exemplary embodiment, there has been given an example of changing the playback speed of the high-speed moving image to the actual time speed, if it has been estimated that the user is searching for a desired moving image. However, it is acceptable if a speed is faster than the playback frame rate during recording and allows the outline to be grasped. Change may be made to a speed at which the moving image may be played back to the end thereof within a time of the playback time for estimating operation calculated in operation S601. In such a case, in a case where the moving image of the same recording time is played back, the playback speed of the moving image becomes even faster, to the point of being in a hurry, and the user becomes able to efficiently grasp the outline of the moving image.

In the present exemplary embodiment, even when the selection is changed in operation S412, after a playback speed of an arbitrary moving image has been changed, the playback time is calculated and recorded in the playback time list. However, when the user operates to slow the playback speed, information stored in the playback time list may be discarded. This is because, at the time point when the user operates to slow the playback speed, it may be guessed that the user is trying to carefully view the moving image. Discarding information stored in the playback time list refers to turning all file names to NULL and all playback times to 0. In doing so, even if the user switches between selections, after the user has carefully viewed the moving image, the high-speed playback will never be performed. Hence, when searching for a moving image in a hurry, the user may efficiently grasp the outline of the moving image. When carefully viewing a moving image after changing the playback speed, the user may view the contents of the moving images at a speed which the manufacturer recommends.

As described hereinabove, with the moving image reproduction apparatus according to the present exemplary embodiment, when searching in a hurry for a desired moving image from among a plurality of still images and moving images, the user may efficiently grasp the outline of the moving images even they are high-speed moving images.

In the first exemplary embodiment, an example has been given in which a file stored in the playback time list is not distinguished between a moving image and a still image. On the other hand, in a second exemplary embodiment of the present invention, a description is given of a method for estimating operation by distinguishing between a moving image and a still image. Further, in the first exemplary embodiment, an example of displaying one moving image of the selection target has been given. On the other hand, in the second exemplary embodiment, a description is given of the moving image reproduction apparatus according to the present exemplary embodiment that performs a plurality of displays. Descriptions will be given assuming that the moving image reproduction apparatus according to the second exemplary embodiment operates in an information processing apparatus, similarly to the first exemplary embodiment.

Figure 7:
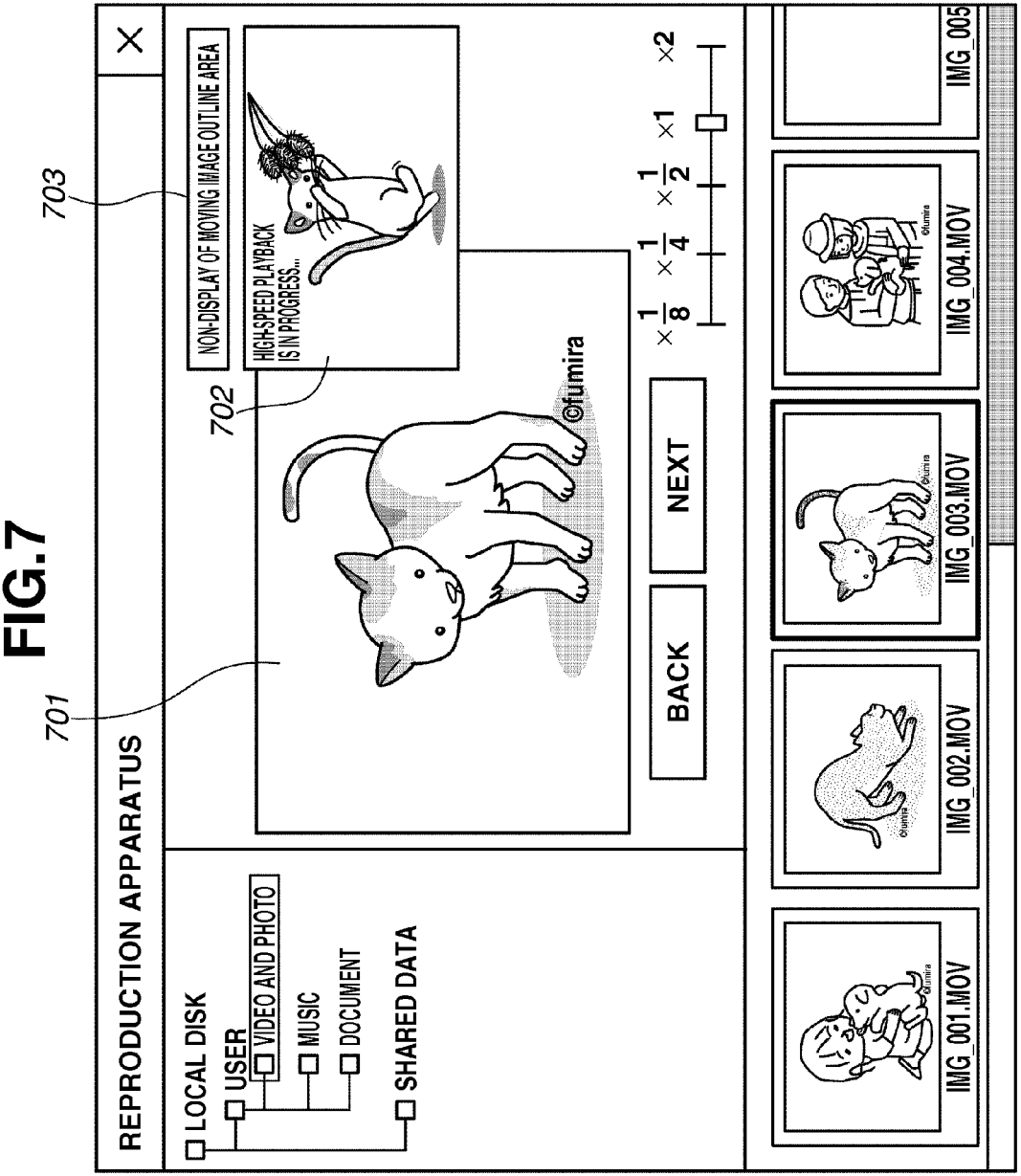
FIG. 7 illustrates a playback screen to be displayed on a display device by a moving image reproduction apparatus according to a second exemplary embodiment of the present invention.

FIG. 7 illustrates a playback screen to be displayed on the display device of the moving image reproduction apparatus according to the second exemplary embodiment. Descriptions will be given with reference to FIG. 3 and FIG. 6 with a focus on different points from the user interface in FIG. 3.

Similar to the preview area 305, an area 701 is an area where data of a still image or moving image of a file in the selected state is played back. An area 702 is an area where a moving image file in the selected state is subjected to high-speed playback. Hereinafter, the area 702 is referred to as a moving image outline display area. The different point from the preview area 701 is that the moving image outline display area is displayed while being partially superimposed on the preview area 701 only when it is determined that the user is searching for a desired moving image from among a plurality of moving images. Determination whether the user is searching for a desired moving image is as described in FIG. 6. Further, when a moving image is displayed in the moving image outline display area 702, the moving image is played back at the frame rate for playback determined in operation S605 in FIG. 6. At the same time, playback of the moving image currently being selected is performed also in the preview area 701. A playback speed in the preview area 701 is set to the playback frame rate during recording.

If the playback speed is changed by the user's operation in the playback speed slider 308 while moving image playback is in progress in the moving image outline display area 702, the moving image outline display area 702 is turned to non-display, and the moving image is played back in the preview area 701 at the designated playback speed.

Further, when the moving image data has been played back to the end of the moving image data in the moving image outline display area 702, the moving image outline display area 702 is turned to non-display.

A moving image outline display switching button 703 is used to switch between display and non-display of the moving image outline display area 702. When the moving image outline display area 702 is being displayed, the CPU 101 displays a character column of the moving image outline display switching button 703 as "non-display of moving image outline area". Further, when the moving image outline display area 702 is not being displayed, the CPU 101 displays the character column of the moving image outline display switching button 703 as "display of moving image outline area". When the user presses the button 703 by click operation of the pointing device, the CPU 101 determines that a switching operation between display and non-display has occurred, and switches between display and non-display of the moving image outline display area 702. When the moving image outline display area 702 is switched from non-display to display, the CPU 101 determines that an instruction of the high-speed playback has been issued from the user, and performs playback at a frame rate higher than the playback frame rate during recording. With regard to a moving image for which a playback frame rate during recording is not present, playback is performed at a frame rate higher than the recording frame rate. In a case where a file of still image is in the selected state, the moving image outline display switching button 703 is disabled, so as not to accept an operation from the user.

FIG. 8 illustrates an example of data of the playback time list in the moving image reproduction apparatus according to the second exemplary embodiment. The CPU 101 generates and stores the data in the RAM 103. FIG. 8 corresponds to FIG. 5 in the first exemplary embodiment. With a focus on different points from FIG. 5, descriptions will be given below using FIG. 8 while referring to FIG. 5.

Similar to the column 501, a column 801 stores file names of the selection target. A column 802 stores file types indicating whether the data in the files in the column 801 is a moving image or a still image.

A column 803 stores kinds of the files in the column 801. For still images, information of still images is stored in the kind column 803. For moving images, kinds of the moving images are discriminated from recording frame rates and playback frame rates during recording, and are stored.

If the recording frame rate and the playback frame rate during recording have the same value, the moving image is classified as a normal moving image. Of the recording frame rate and the playback frame rate during recording, if there is only either information, the moving image is also classified as a normal moving image.

If the playback frame rate during recording has a larger value than that of the recording frame rate, the moving image is classified as an interval moving image. The interval moving image refers to a moving image which has been captured so as to be able to easily perceive as a motion, by recording such a slow motion that a person may not be aware at a low frame rate, and playing back at an increased playback speed. It is used when, for example, shooting a scene how a flower opens as a moving image which allows the user to easily perceive the motion. When the recording frame rate is 5 fps and the playback frame rate during recording is 30 fps, playback at the playback frame rate during recording will result in playback at a speed six times faster than the actual time speed. A playback speed determined according to a frame rate is as given in Equation (2).

If the recording frame rate has a larger value than that of the playback frame rate during recording, the moving image is classified as a high-speed moving image. The high-speed moving image is as described in the first exemplary embodiment. Similar to the column 502, a column 804 stores times taken to play back the files in the column 801.

The operations of generating and updating the playback time list illustrated in FIG. 8 will be described below by using the flowchart in FIG. 4. Different operations from those in the first exemplary embodiment are only operation S400 and operation S414. Descriptions will be given below with a focus on different points.

In operation S400, the CPU 101 generates the playback time list. In the first exemplary embodiment, information concerning five files has been stored in the playback time list, but in the second exemplary embodiment, information concerning ten files has been stored. At the time of generation, the CPU 101 records NULL in the file name 801 and the file type 802 and the file kind 803, and 0 in the playback time 804.

In operation S414, the CPU 101 updates the playback time list illustrated in FIG. 8. The file names of selected files loaded in operation S401 are stored in the column 801 of the playback time list, and the playback times of the files in the column 804. In addition, information indicating whether the files are moving images or still images is stored in the column of the file type 802. Furthermore, the CPU 101 discriminates a kind of the moving image based on the recording frame rate and the playback frame rate during recording of the attribute information region 201 of the files, and stores the kind of the moving image in the column 803. However, if the file is a still image, it is stored as "still image" in the column 803. If there is NULL in the file name column 801 in the playback time list, the file name and the playback time are stored in a row of the top NULL. If file names instead of NULL are stored in all ten data in the playback time list, the top row is deleted, and the second and beyond rows are moved upward one by one row, so that information of the file is stored in an empty row at the end. Through the processing, the playback times relating to most recent ten files or less are stored as a list.

An operation of determining a moving image playback speed using the playback time list illustrated in FIG. 8 will be described using the flowchart in FIG. 6. The different operation from those in the first exemplary embodiment is only operation S601. With a focus on the different point, descriptions will be given below.

In operation S601, the CPU 101 calculates a playback time for estimating the user's operation. The user's operation refers to an operation of searching for a desired moving image from among a plurality of moving images and still images, or an operation of carefully viewing contents of respective files. An average of the playback times for the moving images in the file type 802, in the playback time list illustrated in FIG. 8 is taken as a playback time for estimating operation. For the playback times illustrated in FIG. 8, the playback time for estimating operation becomes 5 seconds.

In the present exemplary embodiment, if the moving image data has been played back to the end of the moving image data in the moving image outline display area 702, the moving image outline display area 702 is turned to non-display, as described above. Alternatively, playback from beginning of the moving image may be started again. Accordingly, the outline of the moving image may be repeatedly confirmed.

In the present exemplary embodiment, the playback times of most recently selected ten files are stored in the playback time list, but it is not limited to ten. If there is a sufficient storage area in the RAM 103, the moving image files up to a predetermined number may be stored in the playback time list. Although the playback times of the still images are stored in the playback time list, only the playback times of the moving images may be stored, if necessary information for calculation of the playback time for estimating operation is only the playback times of the moving images like those in the present exemplary embodiment.

In the present exemplary embodiment, the playback times for estimating operation are calculated, according to the file type 802 indicating whether the file is a moving image or a still image. Alternatively, the playback times for estimating operation may be calculated according to the file kind 803. In operation S601, an average of the playback times of the high-speed moving images in the file kind 803 is taken as an operation estimation time. Accordingly, when the playback time of the high-speed moving image is long, it is estimated that the user is carefully viewing. When the playback time is short, it is estimated that the user is searching for a desired moving image in a hurry.

As described above, even if a playback time by the user, that is, a confirmation time, varies according to a kind of the moving image, the moving image may be played back at an appropriate playback speed.

As described above, with the moving image reproduction apparatus according to the present exemplary embodiment, the playback time of a moving image is used for estimating operation, excluding the playback time of a still image, of which contents may be confirmed at a glance. Hence, whether the user is searching for a desired moving image in a hurry may be estimated accurately, and during searching, the outline of the moving image may be efficiently grasped even it is the high-speed moving image.

In addition, with the moving image reproduction apparatus according to the present exemplary embodiment, when the user is searching in a hurry for a desired moving image from among a plurality of still images and moving images, the same moving image is played back at different speeds in two areas. Hence, the outline of the moving image, even it is a high-speed moving image, may be efficiently grasped via the moving image outline display area 702. At the same time, even when the user wants to carefully view a moving image, the contents of the moving image may be confirmed in the preview area 701.

In the first exemplary embodiment and the second exemplary embodiment, an example in which the moving image reproduction apparatus operates in the information processing apparatus has been given. In a third exemplary embodiment of the present invention, the moving image reproduction apparatus according to the present exemplary embodiment which operates in a digital camera will be described. Further, in the first exemplary embodiment and the second exemplary embodiment, the user operation is estimated by using the playback times. On the other hand, in the third exemplary embodiment, the moving image reproduction apparatus according to the present exemplary embodiment that estimates the user's operation according to the playback time from beginning to end of the moving image data and the percentage of the playback time will be described.

First, a digital still camera which operates as the moving image reproduction apparatus according to the third exemplary embodiment will be described below. Further, in order to make clear the points of embodiments of the invention, descriptions will be given below with a focus on a playback function for playing back image data within a storage medium, rather than imaging functions of the digital still camera.

Figure 9:
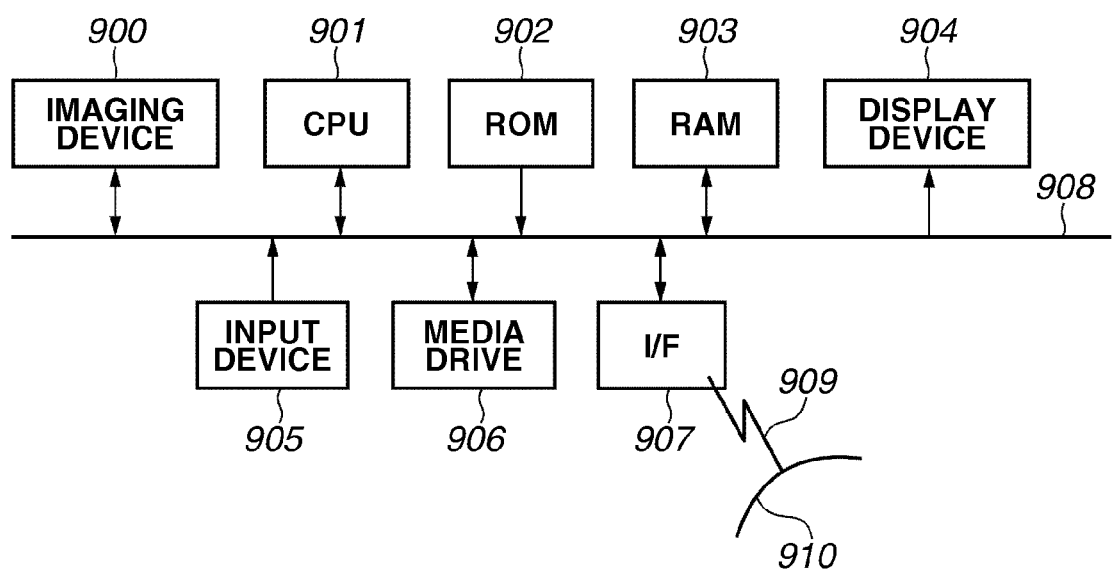
FIG. 9 is a block diagram illustrating a configuration of a digital still camera according to a third exemplary embodiment of the present invention.

FIG. 9 is a block diagram illustrating a configuration of a digital still camera according to the third exemplary embodiment. The moving image reproduction processing described below is implemented by executing a predetermined control program in the digital still camera, and the digital still camera works as the moving image reproduction apparatus. The fact that the digital still camera works as the moving image reproduction apparatus will be described with reference to FIG. 9.

In FIG. 9, an imaging device 900 converts an optical image into electrical image data to generate image data using a solid-state image sensor. A CPU 901 performs control of the entire digital still camera. A ROM 902 stores an operational processing procedure of the CPU 901 (e.g., programs for processing when a power source of the digital still camera is turned on or basic input and output processing). A RAM 903 works as a main memory for the CPU 901. Various types of programs including a control program for realizing the processing described below are loaded into the RAM 903 from the ROM 902 or the like and are executed by the CPU 901. Further, the RAM 903 provides a work area when the CPU 901 executes various types of processing. A display device 904 performs various types of displays under control of the CPU 901. An input device 905 is composed of buttons or the like for performing various types of operations. The details of buttons will be described below.

A storage medium attachment unit (media drive) 906 may receive a detachably attachable storage medium to enable storage of data and readout of the stored data. A network interface 907 is connected to a computer network 910 via a communication line 909. By the network interface, data from a server computer or a personal computer is transmitted and received. A system bus 908 (composed of an address bus, a data bus, and a control bus) establishes connections among the above-described respective units.

Figure 10:
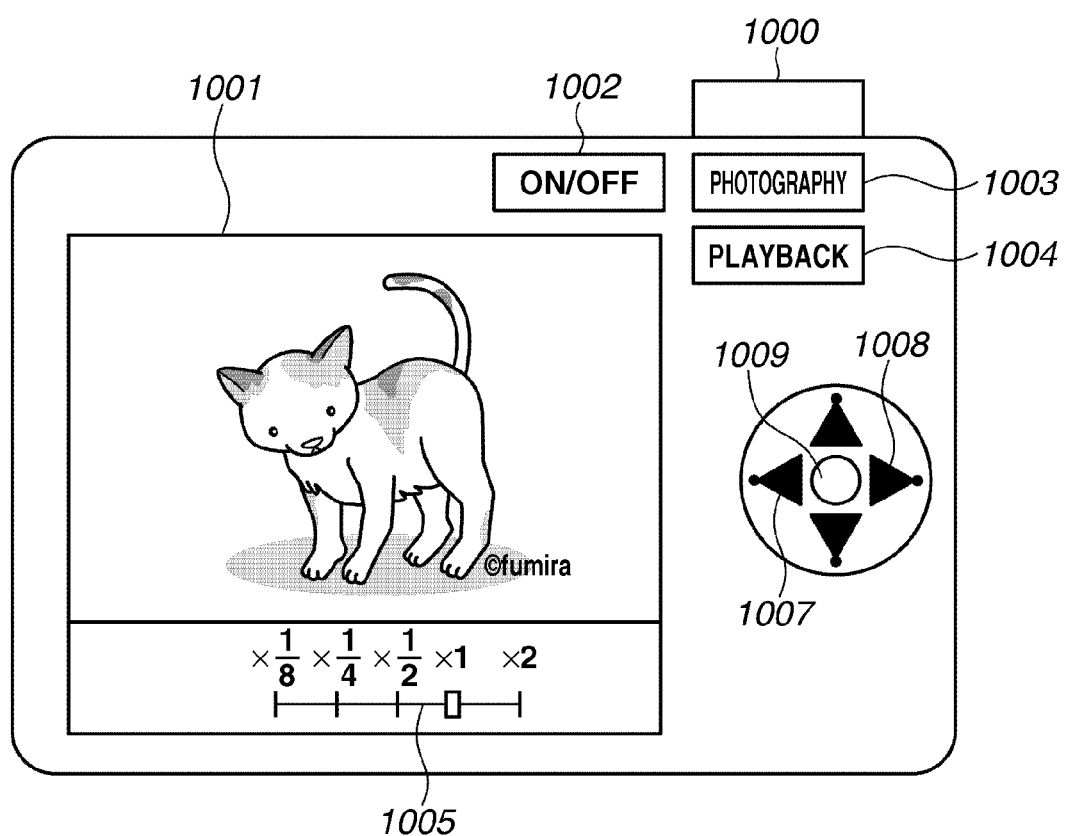
FIG. 10 illustrates an example of an appearance as seen from a back surface of the digital still camera according to the third exemplary embodiment.

FIG. 10 illustrates an example of appearance as viewed from a back surface of the digital still camera according to the present exemplary embodiment. Among various types of buttons or the user interfaces in FIG. 10, there are members having the same functions as those of the user interfaces described in FIG. 3. Thus, the details of various types of buttons and the user interfaces of the digital still camera that operates as the moving image reproduction apparatus according to the present exemplary embodiment will be described below using FIG. 10 while referring to FIG. 3. There are two kinds of modes in the digital still camera described in the present exemplary embodiment, and the digital still camera performs operations corresponding to respective modes. Firstly, "imaging mode" which performs an imaging operation, and secondly, "playback mode" which displays moving image and still image data within the storage medium. The mode which will be mainly described in the present exemplary embodiment is the "playback mode". With regard to all buttons other than a power button 1002, operations when the digital still camera is powered on will be described.

When the user presses a release button 1000, the CPU 901 determines that an imaging instruction has been issued from the user, and switches to the imaging mode to perform imaging processing. A display 1001, as described in FIG. 9, performs various types of displays under control of the CPU 901. For the imaging mode, the display 1001 displays a captured image. For the playback mode, the display 1001 plays back the moving image or the still image data selected according to the user operation. The display 1001 has a function corresponding to the preview area 305. The power button 1002 switches between power ON and power OFF. When the user presses the power button 1002, while the digital still camera is not powered on, the CPU 901 determines that an instruction for power source input has been issued from the user, and turns the power on. When the user presses the power button 1002 while the digital still camera is powered on, the CPU 901 determines that an instruction for power off has been issued from the user, and turns the power off.

When the user presses an imaging mode button 1003, the CPU 901 determines that an instruction for switching to the imaging mode has been issued from the user, switches to the imaging mode, makes preparation for the imaging operation by the imaging device 900, and displays the captured image on the display 1001.

When the user presses a playback button 1004, the CPU 901 determines that an instruction for switching to the playback mode has been issued from the user, loads the moving image or the still image data from the storage medium, and displays the image on the display 1001. Immediately after switching from the imaging mode to the playback mode, the CPU 901 displays the last data in the order of file names out of the files stored in the storage medium.

In the playback mode, when the user presses a left arrow button 1007 or a right arrow button 1008, the CPU 901 determines that an instruction for switching between selection targets has been issued from the user, switches between the selection targets according to a direction of the arrow. When the moving image or the still image is played back, the left arrow button 1007 corresponds to the back button 306, and the right arrow button 1008 corresponds to the next button 307.

A playback speed change slider 1005 performs display and change of playback speeds. It corresponds to the playback speed slider 308 in FIG. 3. When moving image data is played back, in the playback mode, a knob is displayed at a position corresponding to a playback speed of the moving image. When still image data is played back, in the playback mode, display or change of the playback speed may not be performed, and therefore the playback speed change slider 1005 is disabled.

If the moving image data is played back in the playback mode, when the user presses a determination button 1009, the CPU 901 determines that an instruction for changing the playback speed has been issued from the user, and enables a change of a position of the knob of the playback speed change slider 1005. When the left arrow button 1007 or the right arrow button 1008 is pressed, after the determination button 1009 has been pressed, a position of the knob of the playback speed change slider 1005 is changed according to the direction of the arrow. At the same time, the CPU 101 determines that the user has issued a playback speed change instruction, changes to a playback speed corresponding to the position of the knob, and plays back the moving image. A frame rate corresponding to a playback speed is as given in Equation (1). A playback speed corresponding to a frame rate is as given in Equation (2). When the user presses the determination button 1009, again, in a state where the playback speed may be changed, the CPU 901 returns the functions of the left and right arrow buttons 1007 and 1008 to the change function of the playback target from the playback speed change function.

FIG. 11 illustrates an example of data of the playback time list in the moving image reproduction apparatus according to the third exemplary embodiment. The CPU 101 generates and stores the data in the RAM 103. FIG. 11 corresponds to FIG. 5 in the first exemplary embodiment and FIG. 8 in the second exemplary embodiment. With a focus on different points from FIG. 5 and FIG. 8, descriptions will be given using FIG. 11 while referring to FIG. 5 and FIG. 8.

A column 1101 stores file names of the selection targets, similarly to the column 501 and the column 801. A column 1102 stores therein file types of moving images or still images, similarly to the column 802. A playback time 1103 is a playback time from beginning to end of a moving image in the frame rate for playback, in a case where respective files are moving images. Assuming that variables retain the following values, a playback time from beginning to end is given in Equation (3).

recodeFps: recording frame rate (fps)
recodeTime: recording time (sec)
playedFps: frame rate for playback (fps)
allPlayTime: playback time from beginning to end in frame rate for playback (sec)

$$allPlayTime=(recodeFps \times recodeTime) \div playedFps \quad (3).$$

A column 1104 stores therein times taken to playback the files, similarly to the column 502 and the column 804. A column 1105 stores the percentage of the playback time 1104 relative to the playback time 1103 from beginning to end. Assuming that variables retain the following values, the percentage of the playback time is given in Equation (4).

playedTime: playback time (sec)
retioOfPlTime: percentage of playback time (%)

$$retioOfPlTime=(playedTime \times 100) \div allPlayTime \quad (4).$$

The operations of generating and updating the playback time list illustrated in FIG. 11 will be described below using the flowchart in FIG. 4. Different operations from the first exemplary embodiment are only operation S400 and operation S414. With a focus on different points, descriptions will be given below.

In operation S400, the CPU 101 generates a list of the playback times. In the first exemplary embodiment, the CPU 101 stores the information concerning five files in the playback time list. On the other hand, in the third exemplary embodiment, the CPU 101 therein stores information concerning ten files. At the time of generation, NULL is recorded in the file name 1101 and in the file type 1102, and 0 is recorded in the playback time 1103 from beginning to end and in the percentage 1105 of display to the playback time 1104.

In operation S414, the CPU 101 updates the playback time list illustrated in FIG. 11. The CPU 101 stores a file name of the selected file loaded in operation S401 in the column 1101 of the playback time list, and a playback time of the file in the column 1104. In addition, the CPU 101 stores information indicating whether the file is a moving image or a still image in the column of the file type 1102. Furthermore, the CPU 101 calculates a time from beginning to end of the moving image at the frame rate for playback based on the recording frame rate and the recording time of the attribute information region 201 of the file, and the frame rate for playback stored in the RAM 103, and stores the time in the column 1103. A playback time from beginning to end is as given in Equation (3). Further, the CPU 101 calculates a percentage of the playback time based on the playback time 1103 from beginning to end and the playback time 1104, and stores the percentage in the column 1105. A percentage of the playback time is as given in Equation (4). However, if the file is a still image, "−1" is stored in the columns 1103 and 1105. If there is NULL in the column 801 for file name, in the playback time list, the file name and the playback time are stored in a row which contains the top NULL. If the file names instead of NULL are stored in all ten data in the playback time list, the top row is deleted, and the second and beyond rows are moved upward one row by one row, so that information of the file is stored in an empty row at the end. Through the processing, the playback times relating to most recent ten files or less are stored as a list.

Using the playback time list illustrated in FIG. 11, an operation of determining a moving image playback speed will be described below using the flowchart in FIG. 6. The different operation from the first exemplary embodiment is only operation S601. With a focus on the different points, descriptions will be given below.

In operation S601, the CPU 101 calculates a playback time for estimating the user's operation. The user's operation refers to an operation for searching for a desired moving image from among a plurality of moving images and still images, or an operation of carefully viewing the contents of the respective files. In the playback time list illustrated in FIG. 11, a value obtained by multiplying an average of the percentages of the playback times for moving images in the file type 1102 by a reference value is taken as a playback time for estimating operation. In the present exemplary embodiment, the reference value is assumed to be 100. Assuming that variables retain the following values, a playback time for estimating operation is given in Equation (5).

aveRetioOfPlTime: average value of percentages of playback times (%)
baseTime: reference value (sec)
judgePlayTime: playback time for estimating operation (sec)

$$judgePlayTime = (aveRetioOfPlTime \times baseTime) \div 100 \quad (5).$$

In the case of the percentages of the playback times illustrated in FIG. 11, the playback time for estimating operation becomes 25.9125 sec. Then, in operation S604, the CPU 101 determines whether the playback time for estimating operation calculated in operation S601 is smaller than a threshold value. In the moving image reproduction apparatus according to the present exemplary embodiment, the threshold value is set to 30 seconds. If the playback time for estimating operation is smaller than the threshold value, it is estimated that the user is searching for a desired moving image. If the playback time for estimating operation is equal to or greater than the threshold value, it is estimated that the user is carefully viewing the contents of respective files.

Difference between the first exemplary embodiment and the second exemplary embodiment is to use only an average of the playback times to perform determination. In the first exemplary embodiment and the second exemplary embodiment, in the case of only moving images in which a time from beginning to end of the moving image data is short, it will be determined sometimes that the user is searching for a desired moving image, even if the user is carefully viewing the moving images. However, if a method of the third exemplary embodiment is used, a percentage of the playback time is used, and as a result, it is possible to accurately estimate an operation even in the case of only short moving images.

In the present exemplary embodiment, the playback time for estimating operation is calculated from a percentage of the playback time, to perform determination in operation S604. Instead, the percentage of the playback time itself may be used in the determination in operation S604. In that case, the threshold value in operation S604 takes a percentage instead of a number of seconds. In the above-described descriptions, the threshold value is 30 seconds, but in this case, takes, e.g., 30%. Accordingly, if the user displays all images from beginning to end of the moving image data, it is determined that the user is carefully viewing the moving image data, and if the user displays only less than 30% of all images from beginning to end, it may be determined that the user is searching in a hurry for a moving image.

In the present exemplary embodiment, the playback times of most recently selected ten files are stored in the playback time list, but it is not limited to ten. If there is a sufficient storage area in the RAM 103, the moving image files, until they reach a predetermined number, may be stored in the playback time list. Further, the playback times of the still images are stored in the playback time list. Like those in the present exemplary embodiment, however, if necessary information for calculation of the playback time for estimating operation is only the playback time of the moving image, only the playback time of the moving image may be stored.

As described above, with the moving image reproduction apparatus according to the present exemplary embodiment, a percentage of the playback time relative to a time from beginning to end of the moving image is used for estimating an operation. Then, since the operation estimation is made according to the percentage of the playback time relative to the playback time of the moving image, the operation estimation may be made by distinguishing between a case of carefully viewing a short moving image up to the end of the moving image and a case of viewing only a little the beginning of a long moving image, and the moving image may be played back at an appropriate playback speed. Hence, it may be estimated accurately whether the user is searching for a desired moving image in a hurry. If the user is searching, the user may efficiently grasp the outline of the moving image, even it is a high-speed moving image.

Figure 12:
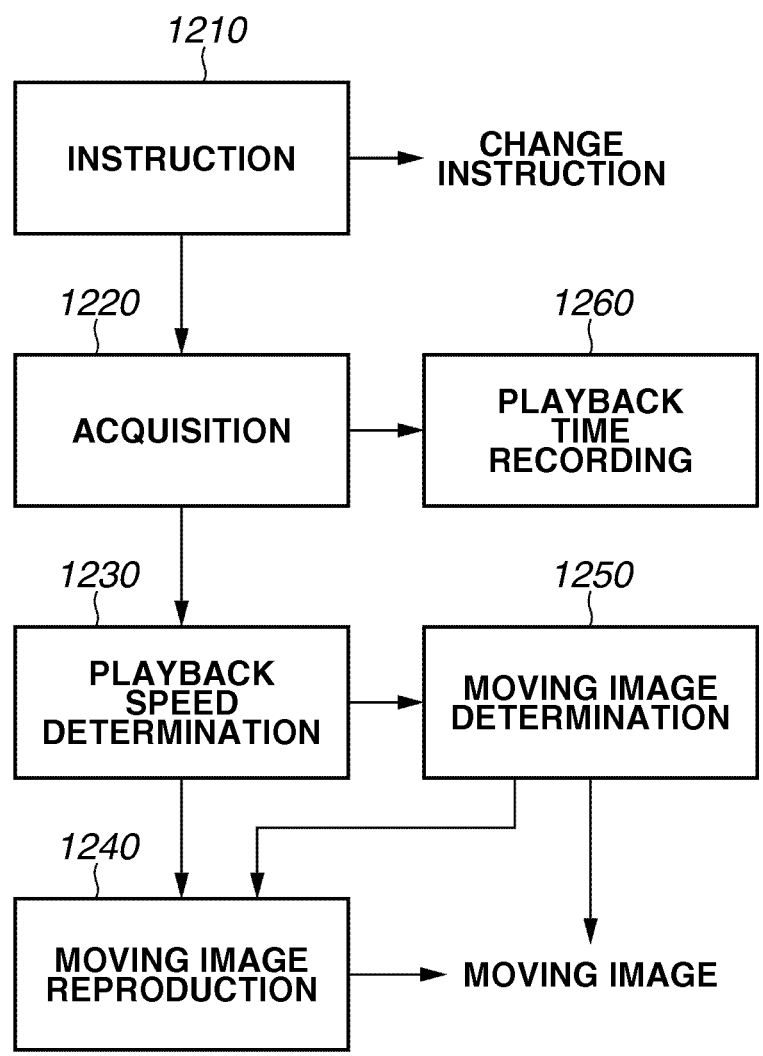
FIG. 12 illustrates an example of the moving image reproduction apparatus according to one embodiment.

FIG. 12 illustrates an example of the moving image reproduction apparatus 1200 according to one embodiment. The moving image reproduction apparatus 1200 may represent any of the embodiments described above. The moving image reproduction apparatus 1200 includes an instruction unit 1210, an acquisition unit 1220, a playback speed determination unit 1230, a moving image reproduction unit 1240, a moving image determination unit 1250, and a playback time recording unit 1260. The moving image reproduction apparatus 1200 may include more or less than the above components. In addition, any of the above components may be implemented by a hardware circuit, a software module embodied in a memory device, a firmware device, or any combination of the above.

The instruction unit 1210 is configured to issue a change instruction for changing a playback target to another moving image while a selected moving image is being played back.

The acquisition unit 1220 is configured to, if the change instruction has been issued by the instruction unit 1210, acquire a playback time of the moving image which has been played back until the instruction for change.

The playback speed determination unit 1230 is configured to determine a playback speed of the moving image to be played back after the change instruction, according to the playback time acquired by the acquisition unit. The playback speed determination unit 1230 determines the playback speed based on the playback time acquired by the acquisition unit 1220 and a frame rate of the moving image. It may also determine the playback speed based on a plurality of playback times acquired by the acquisition unit 1220 according to a plurality of times of the change instruction. It may determine the playback speed based on a comparison between an average of a plurality of playback times acquired by the acquisition unit 1220 according a plurality of times of the change instruction and a predetermined threshold value. It may also determine the playback speed to be a higher speed accordingly as the playback time acquired by the acquisition unit 1220 is shorter.

The moving image reproduction unit 1240 is configured to play back the moving image instructed for reproduction by the change instruction at the playback speed determined by the playback speed determination unit 1230.

The moving image determination unit 1250 is configured to, based on attribute information associated with a moving image as the playback target, determine whether the moving image is a high-speed moving image. If it is determined by the moving image determination unit 1250 that the moving image is the high-speed moving image, the moving image reproduction unit 1240 plays back the high-speed moving image at the playback speed determined by the playback speed determination unit 1230.

The playback time recording unit 1260 is configured to record the playback time acquired by the acquisition unit 1220 for each moving image.

In the above-described exemplary embodiments, descriptions has been given with a case of handling a high-speed moving image, but the above-described exemplary embodiments may be also utilized for a moving image in which the frame rate during imaging and the frame rate during playback are substantially the same and which is predicated on the playback at the actual time.

In this case, in the case of searching for a desired moving image from among many moving images, the images will be played back in fast-forward rather than the actual time playback, when it is determined as switching between images in a short time.

The moving images which are predicated on the playback at the actual time are often easy to grasp a change of the images than the case of handling high-speed moving images, but there are moving images with less change depending on contents. For this reason, it may be convenient sometimes to employ a reproduction method like the one in various embodiments of the present invention. Therefore, the reproduction method may not be said to be effective only for the high-speed moving images. However, in the case of the high-speed moving images, a change of the images is often slow, and, therefore, embodiments of the present invention may be applied more effectively to the high-speed moving images.

Aspects of the embodiments of the present invention may also be realized by a computer of a system or apparatus (or devices such as a CPU or MPU) that reads out and executes a program recorded on a memory device to perform the functions of the above-described embodiment(s), and by a method, the operations of which are performed by a computer of a system or apparatus by, for example, reading out and executing a program recorded or stored on a memory device to perform the functions of the above-described embodiment(s). For this purpose, the program is provided to the computer for example via a network or from a recording medium of various types serving as the memory device (e.g., computer-readable medium).

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a playback target, an instruction, a high-speed moving image, a memory). In addition, the operations in the method transform the elements or parts from one state to another state. The transformation is particularized and focused on reproducing a moving image. The transformation provides a different function or use such as determining a playback speed, playing back the moving image instructed for reproduction, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-251155 filed Nov. 9, 2010, which is hereby incorporated by reference herein in its entirety.

What is claimed is:

1. A moving image reproduction apparatus comprising:
    an instruction unit configured to issue a change instruction for changing a playback target to a second moving image file while a first moving image file is being played back;
    an acquisition unit configured to, when the change instruction for changing the playback target to the second moving image file has been issued by the instruction unit, acquire a playback time of the first moving image file from when playing back the first moving image file starts and until the change instruction has been issued;
    a playback speed determination unit configured to determine a playback speed of the second moving image file to be played back after the change instruction, according to the playback time acquired by the acquisition unit; and
    a moving image reproduction unit configured to play back the second moving image file instructed for reproduction by the change instruction at the playback speed determined by the playback speed determination unit.

2. The moving image reproduction apparatus according to claim 1, further comprising a moving image determination unit configured to, based on attribute information associated with a moving image file as the playback target, determine whether the moving image file is a high-speed moving image file,
    wherein, if it is determined by the moving image determination unit that the moving image file is the high-speed moving image file, the moving image reproduction unit plays back the high-speed moving image file at the playback speed determined by the playback speed determination unit.

3. The moving image reproduction apparatus according to claim 1, further comprising a playback time recording unit configured to record the playback time acquired by the acquisition unit for each moving image files.

4. The moving image reproduction apparatus according to claim 1, wherein the playback speed determination unit determines the playback speed based on the playback time acquired by the acquisition unit and a frame rate of the moving image file.

5. The moving image reproduction apparatus according to claim 1, wherein the playback speed determination unit determines the playback speed based on a plurality of playback times acquired by the acquisition unit according to a plurality of times of the change instruction.

6. The moving image reproduction apparatus according to claim 1, wherein the playback speed determination unit determines the playback speed based on a comparison between an average of a plurality of playback times acquired by the acquisition unit according a plurality of times of the change instruction and a predetermined threshold value.

7. The moving image reproduction apparatus according to claim 1, wherein the playback speed determination unit determines the playback speed to be a higher speed accordingly as the playback time acquired by the acquisition unit is shorter.

8. A moving image reproduction method comprising:
    issuing a change instruction for changing a playback target to a second moving image file while a first moving image file is being played back;
    when the change instruction for changing the playback target to the second moving image file has been issued, acquiring a playback time of the first moving image file from when playing back the first moving image file starts and until the change instruction has been issued;
    determining a playback speed of the second moving image file to be played back after the change instruction, according to the acquired playback time; and
    playing back the second moving image file instructed for reproduction by the change instruction at the determined playback speed.

9. The moving image reproduction method according to claim 8, further comprising:
    based on attribute information associated with a moving image file as the playback target, determining whether the moving image file is a high-speed moving image file; and
    if it is determined that the moving image file is the high-speed moving image file, playing back the high-speed moving image file at the determined playback speed.

10. The moving image reproduction method according to claim 8, further comprising:
    recording the acquired playback time for each moving image file on a memory.

11. The moving image reproduction method according to claim 8, further comprising:
    determining the playback speed based on the acquired playback time and a frame rate of the moving image file.

12. The moving image reproduction method according to claim 8, further comprising:
    determining the playback speed based on a plurality of playback times acquired according to a plurality of times of the change instruction.

13. The moving image reproduction method according to claim 8, further comprising:

determining the playback speed based on a comparison between an average of a plurality of playback times acquired according to a plurality of times of the change instruction and a predetermined threshold value.

14. The moving image reproduction method according to claim 8, further comprising:

determining the playback speed to be a higher speed accordingly as the acquired playback time is shorter.

15. A computer-readable non-transitory storage medium having a program or instructions that, when executed by a computer or a processor, causes or cause the computer or processor to perform operations comprising:

issuing a change instruction for changing a playback target to a second moving image file while a first moving image file is being played back;

when the change instruction for changing the playback target to the second moving image file has been issued, acquiring a playback time of the first moving image file from when playing back the first moving image file starts and until the change instruction has been issued;

determining a playback speed of the second moving image file to be played back after the change instruction, according to the acquired playback time; and playing back the second moving image file instructed for reproduction by the change instruction at the determined playback speed.

* * * * *